(12) United States Patent
Albrecht et al.

(10) Patent No.: US 8,801,818 B2
(45) Date of Patent: Aug. 12, 2014

(54) METHOD AND CLEANING DEVICE FOR CLEANING AND CHECKING A PARTICLE FILTER

(75) Inventors: Andreas Albrecht, Renningen (DE); Peter Benz, Pliezhausen (DE); Charles W. Emley, Emporia, KS (US); Uwe Gaertner, Remshalden (DE); Christian Medau, Koengen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/470,419

(22) Filed: May 14, 2012

(65) Prior Publication Data

US 2013/0298771 A1 Nov. 14, 2013

(51) Int. Cl.
*B01D 39/06* (2006.01)
*B01D 39/14* (2006.01)
*B01D 39/20* (2006.01)
*B01D 24/00* (2006.01)

(52) U.S. Cl.
USPC ............... 55/282.3; 55/522; 55/523; 55/524; 422/169; 422/170; 422/171; 422/172; 422/177; 422/178; 422/179; 422/180; 422/181; 422/182

(58) Field of Classification Search
USPC ................ 55/522–524, 282.3; 422/169–172, 422/177–182
See application file for complete search history.

(56) References Cited

U.S. PATENT DOCUMENTS

| | | | | |
|---|---|---|---|---|
| 5,421,845 A | * | 6/1995 | Gregg et al. | 55/294 |
| 6,132,600 A | * | 10/2000 | Marchesseault et al. | 210/143 |
| 7,371,266 B2 | * | 5/2008 | Streichsbier et al. | 55/283 |
| 8,048,207 B1 | * | 11/2011 | Streichsbier et al. | 95/279 |
| 2004/0020193 A1 | * | 2/2004 | Miebach | 60/295 |
| 2004/0067176 A1 | * | 4/2004 | Pfeifer et al. | 422/177 |
| 2005/0207946 A1 | * | 9/2005 | Asano et al. | 422/177 |
| 2008/0092525 A1 | * | 4/2008 | Ehlers | 60/286 |

FOREIGN PATENT DOCUMENTS

DE 103 21 290 A1 12/2004

* cited by examiner

*Primary Examiner* — Amber Orlando
(74) *Attorney, Agent, or Firm* — Crowell & Moring LLP

(57) ABSTRACT

A method for cleaning and checking a particle filter of a motor vehicle is provided. In a first step soot particles which have collected in the particle filter are burnt off. In a second step ash located in the particle filter is blown out using compressed air. A cleaning device for a particle filter of a motor vehicle is also provided.

1 Claim, 1 Drawing Sheet

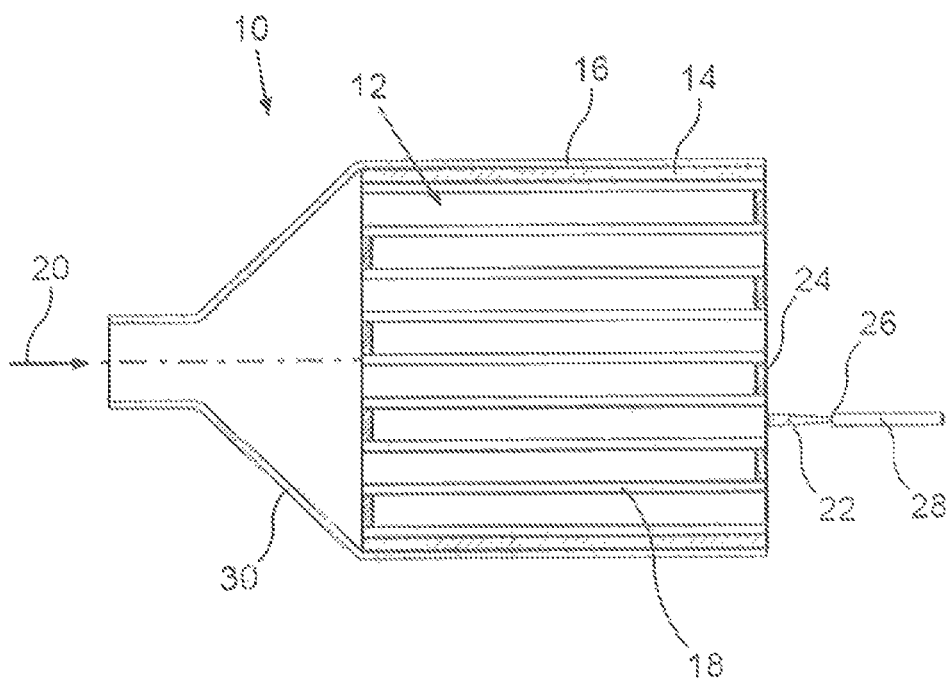

METHOD AND CLEANING DEVICE FOR CLEANING AND CHECKING A PARTICLE FILTER

BACKGROUND AND SUMMARY OF THE INVENTION

The invention relates to a method for cleaning and checking a particle filter of a motor vehicle, wherein in a first step soot particles which have collected in the particle filter are burnt. The invention further relates to a cleaning device for a particle filter.

German patent document DE 103 21 290 A1 describes a method for cleaning a particle filter of a motor vehicle, wherein soot particles that have collected in the particle filter are burnt in a soot burn-off process. In a flushing process after the soot burn-off process ash particles that have collected in the particle filter are removed from the particle filter by means of a flushing medium passed through the particle filter. During the soot burn-off process an oxygen concentration in a hot air flow, to which the particle filter is subjected, is set to less than 10%. When this concentration is exceeded the soot burn-off process is halted in order to avoid uncontrollable soot burn-off with inadmissibly high temperatures and to avoid thermal damage to the particle filter.

Exemplary embodiments of the present invention are directed to a method and a cleaning device that achieves improved cleaning of a particle filter.

In the inventive method, following the first step of burn-off of the soot particles, ash found in the particle filter is blower out by means of compressed a in a second step. Such a blowing-out by means of compressed air has proved to be particularly effective if it is a question of freeing the particle filter from ash, in particular ash of a low density with a slight load. An improved cleaning of the particle filter can thus be achieved. In addition the invention includes in relation to the cleaning process preliminary, intermediate and subsequent checks in order to facilitate quantifiable evidence of the cleaning efficiency.

An end face of the particle filter is hereby preferably subjected to a compressed air jet that covers less than 10% of a surface of the end face, wherein the compressed air jet is moved relative to the end face of the particle filter over the end face. Respective regions of the end face can thereby be subjected in a particularly good and targeted manner to the compressed air and the ash is thus removed from the particle filter. A particularly good cleaning result can be achieved if the compressed air jet covers less than 4% of the surface of the end face, is thus particularly greatly focused. It is thereby further advantageous if the whole end face is moved over spirally by the compressed air jet.

An outlet-side end face of the particle filter is preferably subjected to the compressed air jet, the ash is thus blown out in the counter current in relation to the direction in which during exhaust gas purification the exhaust gas usually flows through the particle filter. The ash can thus be removed particularly extensively from the particle filter.

It has been shown to be further advantageous if success of the cleaning is determined by measuring a dynamic pressure of a particle filter through which air flows respectively before the burn-off of the soot and after blowing out the ash. A dynamic pressure determination can additionally take place after the burn-off of the soot and before blowing out the ash. Through such a comparative measurement it is particularly simple to draw conclusions concerning the success of the cleaning and the state of the filter.

The respective dynamic pressure can hereby be measured while the particle filter is subjected to a defined, constant air mass flow, in particular at a constant temperature. A simple dynamic pressure measurement is thus sufficient in order to assess the success of the cleaning and the state of the filter. In addition or alternatively a detection of the change in the flow resistance of the particle filter can take place through dynamic pressure measurement in a different manner.

The particle filter is hereby initially subjected to a first air mass flow of a first, in particular constant, magnitude and a first pressure is hereby measured. Subsequently the particle filter is subjected to a second air mass flow of a second, in particular constant, magnitude and a second pressure is hereby measured. A pressure difference is formed from the first pressure and the second pressure. The success of the cleaning is then determined by comparing the respective pressure differences in the respective air mass flow before the cleaning process, thus before the burn-off of the soot, and after the cleaning process, thus after blowing out the ash or after an optionally carried out flushing stage with flushing liquid. The respective pressure differences are compared with each other in order to draw conclusions concerning the cleaning effect. This is favorable particularly as the behavior of the particle filter can be considered with different air mass flows particularly well in the determination of the cleaning performance. A detection of the flow resistance can of course also take place with constant pressure or dynamic pressure. In this connection the particle filter is initially subjected to a variable air mass flow until a defined dynamic pressure is reached. The success of the cleaning is then determined through comparative assessment of the respective air mass flows.

It has been shown to be further advantageous if, in dependence upon the cleaning success, the particle filter is subjected to a flushing liquid after blowing out the ash. The liquid cleaning hereby takes place advantageously only when the burn-off of the soot and the blowing out of the ash have not lead to the desired success of the cleaning. The process thereby requires particularly low resources. Such a flushing stage can be necessary in particular with a high ash load and/or in case of an ash load with a comparatively high density.

Even after subjecting the particle filter to the flushing liquid success of the cleaning can be determined by measuring a counter pressure. This can take place in the same way as before subjecting the particle filter to the flushing liquid or blowing out the ash.

In addition or alternatively after subjecting the particle filter to the flushing liquid a visual check of the particle filter can be carried out and the success of the cleaning can be determined with the aid of this visual check. Mechanical damage can also thereby optionally be recognized. For example, a side of the particle filter can be irradiated with light and the light passage through the particle filter on the other side thereof detected. Light of a certain wavelength, in particular infrared light, is thereby preferably used. The visual check thereby preferably covers the whole filter cross-section. If it is hereby determined that too great a proportion of the channels of the particle filter are still blocked, a new liquid cleaning can be carried out.

Finally, it has been shown to be advantageous if an underpressure is supplied to the particle filter during the blowing out of the ash. This suction of the ash can take place from the end face that lies opposite the end face subjected to the compressed air. By simultaneously subjecting to compressed air and supplying the underpressure the ash can be removed particularly effectively from the particle filter.

In the inventive cleaning device for a particle filter of a motor vehicle a heating device is provided that is designed to burn off soot particles that have collected in the particle filter. The cleaning device further comprises a compressed air unit, by means of which ash in the particle filter can be blown out of the particle filter.

The advantages and preferred embodiments described for the method according to the invention also apply to the cleaning device according to the invention.

The features and feature combinations mentioned above in the description and the features and feature combinations mentioned below in the description of the drawings and or shown only in the drawings can be used not only in the indicated combination but also in other combinations or alone without going outside of the scope of the invention.

BRIEF DESCRIPTION OF THE DRAWING FIGURE

Further advantages, features and details of the invention follow from the claims, the following description of preferred embodiments and the drawing.

The sole FIGURE shows schematically a particle filter which is formed as a ceramic wall flow filter for diesel particles.

DETAILED DESCRIPTION

A particle filter 10 shown in the drawing serves for the removal of particles from the exhaust gas of an internal combustion engine of a motor vehicle operated with diesel, whereby it can be in particular a utility vehicle. With increasing duration of operation of the particle filter 10 more and more soot particles and ash are deposited on a substrate or filter material 12 of the particle filter 10 and the exhaust gas counter pressure of an exhaust gas system provided with the particle filter 10 increases. A removal of filtered-out soot particles takes place preferably during an operation of the motor vehicle through continuous oxidation by means of nitrogen dioxide contained in the exhaust gas (passive regeneration) and/or through thermal soot burn-off carried out from time to time (active regeneration). If a certain quantity of ash is collected a cleaning process is implemented, which is described in greater detail below. In the present case the cleaning process is carried out after removal of the particle filter 10 from the motor vehicle. The filter material 12 and a bearing mat 14 hereby remain in a part of the housing of the particle filter 10 formed as a jacketed pipe 16.

In the cleaning process the particle filter 10 is initially checked in the state loaded with particles, thus the uncleaned state. Initially a classification of the particle filter 10 takes place in relation to a thickness of walls 18 of the filter material 12, a material composition and a porosity of the filter material 12 and the filter length as well as the filter cross-section. Subsequently the flow resistance of the filter material 12 or values correlating with the flow resistance is determined.

Air hereby flows through the whole filter cross-section in a flow direction, in which in operation of the particle filter 10 the exhaust gas flows through this, and which is indicated in the drawing by an arrow 20. The respective pressure can hereby be measured using sensors on the inlet side and optionally on the outlet side. Defined values of, for example 600 kg air per hour to 800 kg air per hour, are set for the air mass flow and an at least virtually constant temperature of the air. Pressure measurements can take place with different air mass flows.

Differences can also be formed from the values measured with the respective air mass flows and counter pressures, by reference to which the flow resistance of the particle filter 10 can be assessed. However, merely the dynamic pressure with a constant air mass flow can also be considered in order to compare this with the dynamic pressure present after cleaning. The result of these measurements serves as a comparison measure for the success of the cleaning. Additionally, these starting values can be used to ascertain whether damage is present in the particle filter 10, for example in the form of a crack, hole or break. Furthermore, parameters of the subsequent cleaning process can be fixed by reference to the measurement values obtained during this measurement.

Following this first check of the particle filter 10 before cleaning, a burn-off of the soot particles collected in the particle filter 10 takes place in the furnace. The particle filter 10 can hereby be left for example for four hours at approximately 600° C. in the furnace. The temperature is hereby preferably kept in a range of from 590° C. to 600° C. In addition during the burn-off of the soot particles the particle filter 10 is subjected to air which supplies the oxygen necessary for combustion but is depleted in oxygen. The oxygen content in the combustion air is hereby preferably less than 10%. An uncontrolled soot burn-off can hereby be avoided.

By regeneration air flow flowing through the particle filter 10 a homogeneous filter heating can be achieved. During cooling of the particle filter 10 after the soot burn-off the temperature is preferably reduced by less than 100 K per minute, in particular less than 50 K per minute.

Subsequently, thus after the cooling of the particle filter 10, the ash is blown out of it. This takes place preferably in a counter flow, thus contrary to the flow direction, indicated in the figure by the arrow 20, of the exhaust gas through the particle filter 10 when used in the exhaust gas system. An inlet pressure of between 4 bar and 6 bar can be set depending upon the wall thickness and the type of filter material 12, possibly present catalytic coating and length. A relative air humidity of the compressed air used to blow out the ash preferably amounts to less than 20%. In addition, compressed air free of particles, thus filtered air, is preferably used, whereby it can be ensured for example that the maximum particle size in the compressed air is 1 μm.

As shown schematically in the drawing, a comparatively greatly focused compressed air jet 22 is used to blow out the ash from the filter material 12 so that there is not a flow through the whole cross-section of the filter material 12, but instead only part thereof. The area through which the compressed air jet 22 flows is preferably hereby less than 4% of the whole area of an outlet-side end face 24 of the particle filter 10 in the region of the filter material 12. The compressed air jet 22 moves over the end face 24 in the manner of a grid or spirally.

The compressed air jet 22 can in particular be set so that at a distance of 7 cm from an outlet 26 of a compressed air unit 28 that provides the compressed air 22 a width of the conical compressed air jet 22 is less than 2 cm. Indeed, a force of 3 to 4 Newton, effective for removing the ash, is hereby set at a distance of 30 cm from the outlet 26 with an inlet pressure of approximately 5 bar so that a particularly extensive cleaning can be achieved. An underpressure of, for example, 0.1 to 0.25 bar is preferably set on the side of the particle filter 10 lying opposite the outlet side, thus in the region of an inlet funnel 30. This improves the blowing out of the ash from the filter material 12.

Following these two cleaning steps there is a reassessment of the particle filter 10 in relation to counter pressure behavior or flow resistance. Depending upon the result of this measurement the cleaning can be ended or a liquid cleaning can follow. In order to compare the measurement values before and after the cleaning step of blowing out the ash it is particularly simple for merely the dynamic pressure to be measured with a respectively constant air mass flow or with a plurality of respectively constant air mass flows. If it turns out that the respective pressure after cleaning is more than a predefinable amount lower than before cleaning then it can be concluded that the cleaning was successful. The dynamic pressure difference decisive for success of cleaning is dependent upon the embodiment of the filter material 12. Typically, successful cleaning occurs with an approximately 30 to 40% dynamic pressure reduction. A greater dynamic pressure reduction indicates that there may be a defect in the particle filter 10. For example, there can be a tear or a hole in it so that a flow resistance is particularly greatly reduced. If a lower dynamic pressure reduction is ascertained, cleaning with a flushing liquid is carried out.

Instead of the dynamic pressure measurement with an air mass flow that is constant before and after leaning, the pressure difference between the dynamic pressure with a first, lower air mass flow and with a second, greater air mass flow can be meaningfully used for evaluation of the success of the cleaning.

During the liquid cleaning the whole filter cross-section is preferably subjected to demineralized water. The degree of hardness of the demineralized water can be, for example, less than 1.5 mmol/l calcium carbonate. The water used is preferably free of particles, thus filtered, whereby it is preferably ensured that no particles of more than 1 µm in diameter are present in the water. The volume flow of the water can be set to more than 1.2 cubic meters per hour and a pressure of approximately 300 mbar can be set for the liquid flow. The temperature of the flushing liquid can amount for example to 60° C. or more.

Flow-through phases preferably alternate with phases, in which the water does not flow through the filter material 12 but instead stagnates. The flow-through phases can hereby amount, in particular, to 6 minutes and the standing phases, thus the phases, in which the water does not flow, for example 10 seconds. In particular 8 to 10 of such standing phases can be provided during the liquid cleaning.

The flowing out of the water is preferably set so that the constituent parts removed, from the filter material 12 can be transported away as quantitatively as possible. The residual liquid can be allowed to run out of the particle filter 10 after the liquid has flowed through the filter material 12. Subsequently the particle filter 10 is dried. This drying can take place in particular in a furnace, through which air flows, whereby a temperature of 250° C. can be provided over an hour for drying the particle filter 10.

After this liquid cleaning a measurement of the flow resistance of the cleaned particle filter 10 can be carried out once again. Optionally a visual check can be performed, for example by optically detecting a passage of light through the particle filter 10. If it hereby turns out for example that more than 5% of the channels of the filter material 12 are blocked per side, cleaning with the flushing liquid can be carried out again. An evaluation of the visual check can also take place in relation to a recognition of mechanical damage.

Filter length, filter cross-section, wall thickness, porosity and composition of the filter material 12 influence the default values of the cleaning parameters such as, for example, inlet pressure, air mass flow in the check, pressure values and volume flow while blowing out the ash or while subjecting to the flushing liquid and also the transmitted light check or visual check. In case of a greater wall thickness of the walls 18, a lower volume flow is predefined during the flushing process. The volume flow with a wall thickness of less than 0.35 mm can be more than 1.2 m$^3$/min and with a wall thickness of more than 0.35 mm less than 1.2 m$^3$/min. Correspondingly, the underpressure supplied during blowing out can be up to 150 mbar with a greater wall thickness and more than 300 mbar with the lower wall thickness.

If the porosity of the filter material is more than 40% or 40%, 4 bar can also be provided as an inlet pressure. In case of a porosity of less than 40% on the other hand a maximum inlet pressure of 6 bar can be provided. Likewise, the material composition of the filter material 12 can be considered in that a pressure of approximately 4 bar to 6 bar can be set with a material portion of silicon of more than 80% or 80%. With a material portion of silicon of less than 80% on the other hand a maximum inlet pressure of 4 bar can be provided.

After cleaning with the flushing liquid the flow resistance of the particle filter 10 is measured once again. It is possible to detect—in the same way as before cleaning with the flushing liquid—a respective dynamic pressure or pressure loss with the first, lower air mass flow of for example 600 kg per hour and with the second, greater air mass flow of for example 800 kg per hour and preferably at a constant temperature. The respective measurement values with these air mass flows can be compared with the respective measurement values with the same air mass flows before burn-off of the soot.

There can also be a determination of success of the cleaning if the pressure after cleaning lies in the previously fixed, defined range. Furthermore, if the change in the counter pressure of the particle filter 10 does not lie sufficiently in the defined range a new cleaning stage, in particular a liquid flushing, can be carried out. If the pressure after cleaning continues to lie in the undesired ranges the particle filter 10 can be rejected as defective.

The differences in the pressure before burn-off of the soot and after cleaning can lie, in particular, in the range of from 25 mbar to 300 mbar.

Besides cleaning soot and ash particles that have deposited inside the particle filter 10, the outer side of the particle filter can be cleaned in order to ensure defect-free reinstallation in the vehicle. Although the outer side cleaning can be carried out before the above-described cleaning and checking process, the outer side cleaning is usefully carried out when the above-described cleaning and checking process has been successfully completed and the filter function of the particle filter 10 has been restored. During the outer side cleaning corrosion deposits are removed such as rust and other deposits on the jacketed pipe 16 and in particular on surfaces which are decisive for a sealed reincorporation. Furthermore, smoothing or polishing of the surface can be provided. The outer cleaning preferably takes place in an automated manner by means of brushing. The brushing involves a cleaning device that includes a device for rotational incorporation of the particle 10. For example, the particle filter can be mechanically fixed at the axial ends by means of hydraulic or pneumatic fixing dies and, for cleaning in horizontal or vertical position, set in rotation about its longitudinal axis, whereby the surfaces to be cleaned such as jacketed pipe 16, inlet funnel 30 and connecting surfaces are brought into contact with brushes moving back and forth in such a way that adhering impurities can be removed. Smoothing and/or polishing can be carried out in the same way by means of suitable tools.

Due to the described comprehensive cleaning and checking of the particle filter 10 including its outer surface it is ensured that a high quality and fully functioning particle filter 10 is ready for incorporation in the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for cleaning and checking a particle filter of a motor vehicle, comprising:
   removing the particle filter from the motor vehicle;
   a first step in which soot particles that have collected in the particle filter are burnt off after the particle filter is removed from the motor vehicle; and
   a second step in which ash located in the particle filter is blown out using compressed air after the particle filter is removed from the motor vehicle,
   wherein prior to the first step
      the particle filter is subjected to a first air mass flow of a first magnitude and a first pressure is measured,
      subsequently the particle filter is subjected to a second air mass flow of a second magnitude and a second pressure is measured,
      a first pressure difference is formed between the first measured pressure and the second measured pressure,
   wherein subsequent to the second step
      the particle filter is subjected to a third air mass flow of the first magnitude and third pressure is measured,
      subsequently the particle filter is subjected to a fourth air mass flow of the second magnitude and a fourth pressure is measured,
      a second pressure difference is formed between the third measured pressure and the fourth measured pressure,
   wherein the first magnitude of the first and third air mass flows is different than the second magnitude of the second and fourth air mass flows,
   wherein whether the cleaning is successful is determined by reference to the first and second pressure differences.

* * * * *